UNITED STATES PATENT OFFICE.

JOHN H. BLOCK, OF LEWELLEN, NEBRASKA.

FOOD COMPOUND.

987,849.     Specification of Letters Patent.     Patented Mar. 28, 1911.

No Drawing.     Application filed June 7, 1909. Serial No. 500,538.

*To all whom it may concern:*

Be it known that I, JOHN H. BLOCK, citizen of the United States, residing at Lewellen, in the county of Deuel and State of Nebraska, have invented certain new and useful Improvements in Food Compound, of which the following is a specification.

It is well known to those skilled in the art of stock raising, that separated milk, that is milk from which the butter fat has been extracted is essentially lacking in providing proper nourishment for feeding animals, such as calves, pigs, etc., although the animal heat of the separated milk is a factor which is obviously essential.

With this fact in mind, my present invention has for its primary object to replace by an artificially prepared composition of ingredients, the essentials that are incidental to the extracted butter fats, whereby the calves for instance, will be properly nourished until they are capable of grazing, while at the same time important economies are effected, as the butter fat may be extracted from the milk and the separated milk still used, with other ingredients hereinafter named, with the same beneficial results as would be effected by the unskimmed milk.

In carrying out my invention in the preferred manner, I use the following ingredients mixed in about the proportions stated.

| | |
|---|---|
| Oil of benne | 45% |
| Water | 30% |
| Sugar | 14% |
| Albumen | 4% |
| Sodium phosphate | 2% |
| Calcium phosphate | 2% |
| Tragacanth | 1% |

Preferably, in preparing the composition, I mix the tragacanth with the oil, then in a separate vessel dissolve the sugar in the water. The two liquid mixtures, namely the oil and tragacanth and the sugar and water are then commingled and are allowed to come to a boil, and finally while they are cooling, the calcium phosphate, sodium phosphate and albumen are added. This mixture is then combined with the separated milk to produce the food.

It is to be understood that I do not claim to be the first to produce a food for calves, as a substitute for the mother's milk; but I do claim that I have produced a food for young animals, such as calves, by the use of which separated milk may be used with the same beneficial results, as ordinarily produced by unskimmed milk, whereby, the calves will be nourished to the best possible advantage, and the butter fat used for other purposes. The invention thereby enabling a calf to be raised at a much smaller expense than it would, if it were allowed to feed entirely on the milk of the cow.

In the preferred proportion of the parts, I use about one ounce of the mixture to one gallon of the separated milk.

Having thus described the invention, what is claimed as new is:

The herein described mixture designed to be added to separated milk to replace the food contents lost by the removal of the cream and for use as a food for calves and other young animals, comprising the following ingredients in about the proportions hereinbefore stated, namely, oil of benne, sugar, albumen, sodium phosphate, calcium phosphate and tragacanth.

In testimony whereof I affix my signature in presence of two witnesses.

JOHN H. BLOCK. [L. S.]

Witnesses:
GERTRUDE WEHN,
D. K. SPACHT.

---

Copies of this patent may be obtained for five cents each, by addressing the "Commissioner of Patents, Washington, D. C."